United States Patent [19]

Matsuda

[11] Patent Number: 5,696,992
[45] Date of Patent: Dec. 9, 1997

[54] REGISTER ACCESS CONTROL DEVICE COMPRISING A BUSY/FREE INDICATING UNIT

[75] Inventor: Nobuko Matsuda, Tokyo, Japan

[73] Assignee: NEC Corporation, Tokyo, Japan

[21] Appl. No.: 644,276

[22] Filed: May 10, 1996

Related U.S. Application Data

[62] Division of Ser. No. 59,763, May 12, 1993, Pat. No. 5,524,260.

[30] Foreign Application Priority Data

May 12, 1992 [JP] Japan .................................. 4-118655

[51] Int. Cl.$^6$ .................................................. G06F 15/16
[52] U.S. Cl. .................... 395/873; 395/162; 395/163; 395/490; 395/800; 364/DIG. 1
[58] Field of Search .............................. 395/84, 133, 162, 395/163, 164, 375, 490, 800, 873

[56] References Cited

U.S. PATENT DOCUMENTS

| | | | |
|---|---|---|---|
| 4,811,205 | 3/1989 | Normington et al. | 364/900 |
| 4,851,991 | 7/1989 | Rubinfeld et al. | 364/200 |
| 4,862,392 | 8/1989 | Steiner | 364/522 |
| 4,870,406 | 9/1989 | Gupta et al. | 340/70 |
| 4,916,301 | 4/1990 | Mansfield et al. | 340/747 |
| 5,046,023 | 9/1991 | Katsura et al. | 364/518 |
| 5,299,299 | 3/1994 | Ohuchi | 395/126 |
| 5,299,309 | 3/1994 | Kuo et al. | 395/162 |
| 5,321,806 | 6/1994 | Meinerth et al. | 395/162 |
| 5,333,261 | 7/1994 | Guttag et al. | 395/162 |
| 5,339,394 | 8/1994 | Johnson, Jr. et al. | 395/325 |

*Primary Examiner*—Frank J. Asta
*Attorney, Agent, or Firm*—Foley & Lardner

[57] ABSTRACT

While a busy state is indicated in a status register by a first busy signal kept active while a command is stored in a parameter register group as a stored command, a free state is indicated while a second busy signal is kept inactive until later kept active while a parameter group is stored in the parameter register group as a stored parameter group. After lapse of the free state during which a command executing unit is operable without reference to the stored parameter group, the unit is operable by using a working register group alone. Furthermore, a like parameter group can be stored in the parameter register group, which is connected to a bus through a multiplexer while the second busy signal is inactive. During a short interval during which the first busy signal is inactive and before the second busy signal is activated, another command can be stored through the multiplexer. A logic circuit can be used instead of the status register.

6 Claims, 7 Drawing Sheets

REGISTER ACCESS CONTROL DEVICE COMPRISING A BUSY/FREE INDICATING UNIT

This application is a division of application Ser. No. 08/059,763, filed May 12, 1993, now U.S. Pat. No. 5,524,260.

BACKGROUND OF THE INVENTION

This invention relates to a register access control device for use in an information processing system connected to a utilization device which is typically a graphic or pattern drawing device.

In the manner which will later be described more in detail, a register access control device is connected in an information processing system to a central processing unit (CPU) of the information processing system through a first bus and comprises a register group connected to the first bus so as to be accessed by the central processing unit. In the register access control device, a command executing unit is connected to the register group and to a second bus which is connected, in turn, to the utilization device. In order to put the command executing unit in operation of supplying result commands and result parameters to the utilization device, the central processing unit accesses the register group to store input commands and input parameters in the register group as stored commands and stored parameters, respectively.

A conventional register access control device comprises a busy/idle indicator connected to the first bus and to the command executing unit. The busy/idle indicator indicates a busy state and an idle state of the command executing unit when the command executing unit is put into operation of referring to and using the register group in executing the stored commands on the stored parameters to produce the result commands and the result parameters and when the command executing unit finishes execution of each of the stored commands. When the busy/idle indicator indicates the busy state, the central processing unit is inhibited to access the register group. Meanwhile, the command executing unit continues its operation. When the busy/idle indicator indicates the idle state, the central processing unit is allowed to access the register group. In the meantime, the command executing unit is kept out of operation. The central processing unit is also kept out of operation insofar as storage of the input commands and the input parameters in the register group is concerned.

When the graphic drawing device is used as the utilization device, the central processing unit may deal with graphic or pattern drawing or computer aided design (CAD). The central processing unit may furthermore deal with information processing as an element of the information processing system. Overall performance of the information processing system and the graphic drawing device is raised by parallel operation or pipeline operation of the graphic drawing or the computer aided design and the information processing.

On making the graphic drawing device draw graphics or patterns, the central processing unit first supplies the register group, as the input parameters, with parameters for use in specifying, for example, positions of points used in the graphics and kinds of lines used in the graphics. Next, the central processing unit supplies the register group, as one of the input commands, with a command for use in drawing either a line segment or an arc of the graphics. Based on such parameters and commands stored in the register group as the stored parameters and the stored command or commands, the command executing unit produces the result parameters and the result commands to make the graphic drawing device draw the graphics.

If at least one of the stored commands and the stored parameters were changed while the command executing unit is dealing with the stored commands and parameters, the command executing device would not correctly produce the result command and parameters. The busy/idle indicator consequently prevents the central processing unit from storing the input commands and parameters in the register group and from changing the stored commands and parameters while the busy/idle indicator indicates the busy state. The central processing unit is kept in a waiting state with respect to access to the register group. The command executing unit is also kept in its waiting state.

In the manner described above in connection with a conventional register access control device, the central processing unit and the command executing unit have been kept in a long waiting time on optimally putting a graphic drawing device or a like utilization device in operation. In other words, a long execution time has been inevitable on duly putting such a utilization device in operation. Merits of the parallel operation have adversely been affected.

SUMMARY OF THE INVENTION

It is consequently an object of this invention to provide a register access control device which is connected to a central processing unit of an information processing system connected, in turn, to a graphic drawing device or a like utilization device, and comprises a register group accessible by the central processing unit and a command executing unit for supplying results to the utilization device and in which the central processing unit and the command executing unit are operable with only a short waiting time in putting the utilization device in correct operation.

It is another object of this invention to provide a register access control device which is of the type described and is operable in parallel operation of information processing and of duly operating the utilization device and in which merits of the parallel operation of the information processing system and the graphic drawing device are not adversely affected.

Other objects of this invention will become clear as the description proceeds.

According to an aspect of this invention, there is provided a register access control device connected to a processing unit through a bus and comprises: (A) a parameter register group which the processing unit is accessible through the bus to store commands and parameters therein as stored commands and stored parameters; (B) a working register group; (C) a command executing unit connected to the parameter register group and the working register group and put in operation of referring to the parameter register group and using the working register group in executing the stored commands on the stored parameters; and (D) busy/free indicating means connected to the bus and the command executing unit for indicating a busy state and a free state when the command executing unit is put into operation and when the command executing unit finishes reference to the parameter register group during execution of each of the stored commands.

It is possible by the register access control device set forth above to make (a) the busy/free indicating means inhibit, while indicative of the busy state, the processing unit to access the parameter register group and keep the command executing unit in operation; and (b) the busy/free indicating means allow, while indicative of the free state, the processing unit to access the parameter register group and make the command executing unit continue execution of each of the stored commands by using the working register group alone.

According to another aspect of this invention, there is provided a graphic drawing system, comprising a central processing unit, a first bus connected to the processing unit, a preprocessor connected to the first bus, a second bus connected to the preprocessor, and a graphic processor connected to the second bus, wherein: (A) the preprocessor comprises a register access control device, comprising: (a) a parameter register group which is connected to the first bus and in which the processing unit stores, as stored commands and stored parameters, input commands and input parameters for use in drawing graphics; (b) a working register group; (c) a command executing unit connected to the parameter register group, to the working register group, and to the second bus and put in operation of referring to the parameter register group and using the working register group in executing the stored commands on the stored parameters to supply result commands and result parameters to the second bus; and (d) busy/free indicating means connected to the first bus and to the command executing unit for indicating a busy state and a free state to enable the processing unit to discriminate between the busy and the free states when the command executing unit is put into operation and when the command executing unit finishes reference to the parameter register group during execution of each of the stored commands; and (B) the graphic processor uses the result commands and the result parameters in drawing the graphics.

DESCRIPTION OF THE PREFERRED EMBODIMENTS

Figure 1:
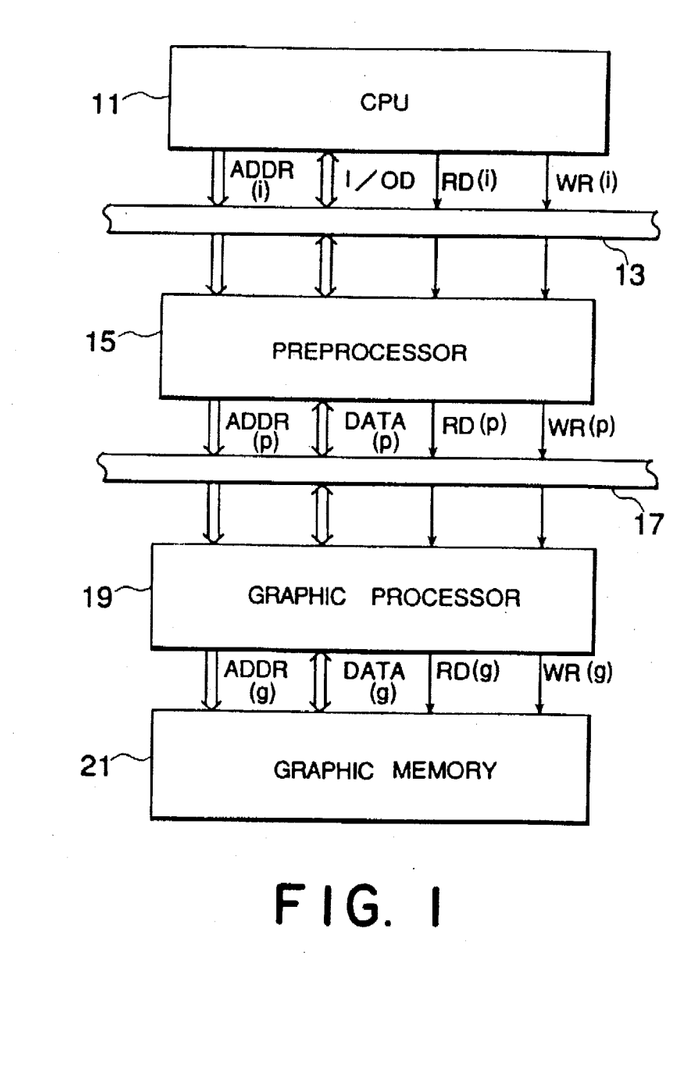
FIG. 1 is a block diagram illustrative in general of an information processing system connected to a graphic drawing device.
Figure 2:
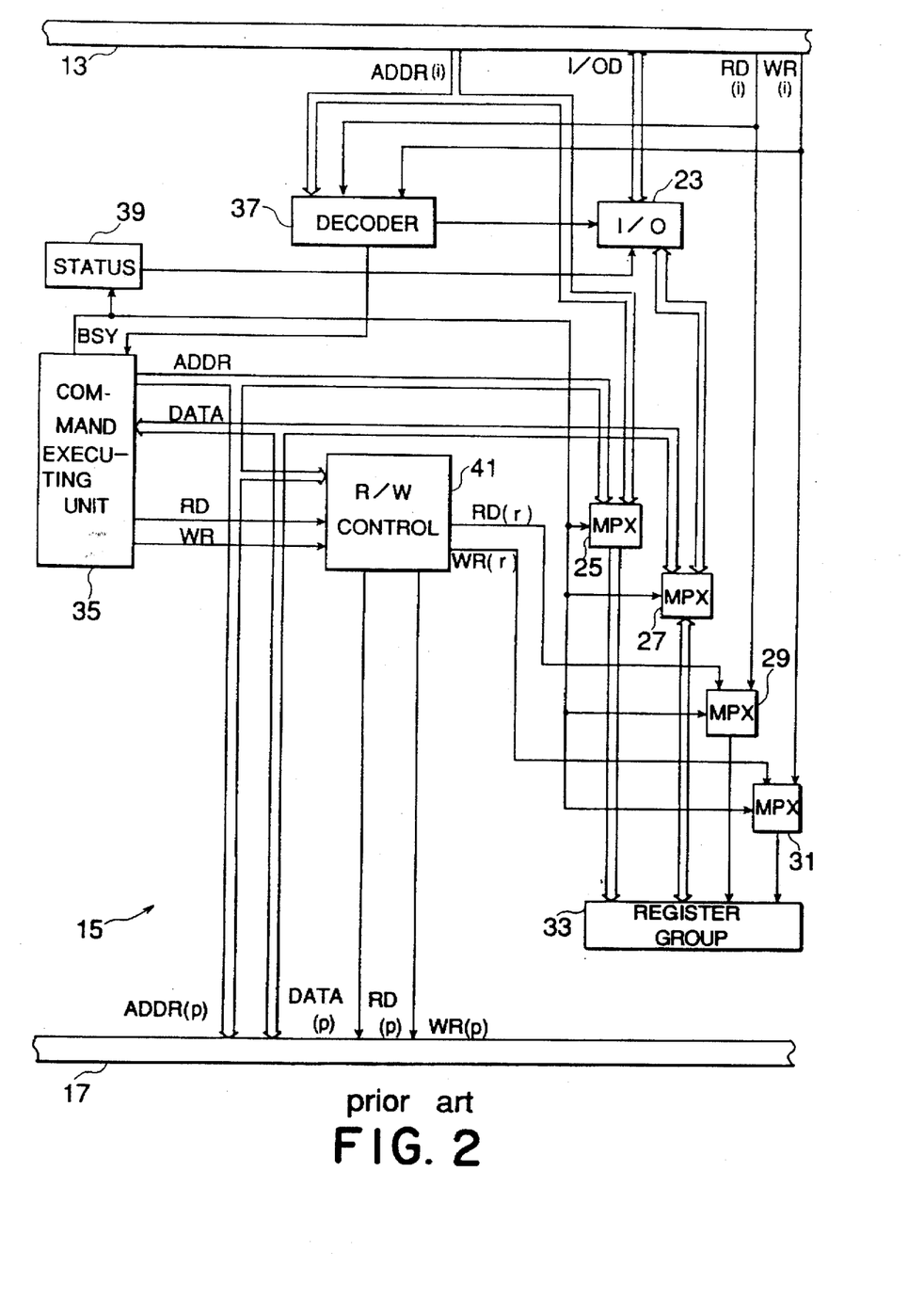
FIG. 2 is a block diagram of a conventional register access control device for use in the circuitry depicted in FIG. 1.

Referring to FIGS. 1 and 2, a conventional register access control device will first be described in order to facilitate an understanding of the present invention. Such a register access control device is used in an information processing system connected to a utilization device which is a graphic or pattern drawing device in the example being illustrated.

In FIG. 1, the information processing system comprises a host central processing unit (CPU) 11 connected to a first bus 13. The central processing unit 11 supplies the first bus 13 with an address signal which is herein called an input address signal and designated by a reference symbol ADDR (i). The central processing unit 11 delivers to and receives from the first bus 13 input and output data signals I/OD. The central processing unit 11 delivers an input read signal RD(i) and an input write signal WR(i) to the first bus 13.

A preprocessor 15 is connected to the first bus 13 to receive therefrom the input address signal, exchange the input and the output data signals with the first bus 13, and receive the input read and write signals. The first bus 13 is connected to other elements (not shown) of the information processing system. The preprocessor 15 is connected to a second bus 17. In the manner which will presently be described in detail, the preprocessor 15 preprocesses the input address signal, the input data signal, the input read signal, and the input write signal into a preprocessed address signal ADDR(p), a preprocessed data signal DATA(p), a preprocessed read signal RD(p), and a preprocessed write signal WR(p) and delivers them to the second bus 17.

A graphic processor 19 is connected to the second bus 17 and, in turn, to a graphic memory 21. A combination of the graphic processor 19 and the graphic memory 21 serves as the graphic drawing device and is operable in the manner known in the art. More particularly, the graphic processor 19 processes the preprocessed address signal, data signal, read signal, and write signal into a graphic address signal ADDR (g), a graphic data signal DATA(g), a graphic read signal RD(g), and a graphic write signal WR(g). Supplying these signals to the graphic memory 21, the graphic processor 19 draws graphics or patterns on the graphic memory 21.

Referring more particularly to FIG. 2, the preprocessor 15 is connected to the first bus 13. The preprocessor 15 is supplied with the input address signal ADDR(i), the input read signal RD(i), and the input write signal WR(i), and exchanges the input and the output data signals I/OD with the first bus 13. Connected to the second bus 17, the preprocessor 15 supplies the preprocessed address signal ADDR(p), data signal DATA(p), read signal RD(p), and write signal WR(p) to the second bus 17. In the manner described heretobefore, the input parameters may represent coordinates of points on the graphics. Each input command indicates either a line or an arc to be drawn in the graphics.

Connected to the first bus 13, a data input/output unit (I/O) 23, an address multiplexer (MPX) 25, a data multiplexer (MPX) 27, a read multiplexer (MPX) 29, and a write multiplexer (MPX) 31 are controlled as will shortly be described. In the manner which will later be described, a register group 33 comprises parameter registers, command registers, and working registers.

Through the address multiplexer 25, the input address signal is supplied to the register group 33 to specify its addresses as input addresses. Through the data input/output unit 23 and the data multiplexer 27, the input data signal is delivered to the register group 33. Through the read multiplexer 29, the input read signal is supplied to the register group 33. When the input write signal is delivered to the register group 33 through the write multiplexer 31, the input parameters and the input commands are stored in the parameter and the command registers at the input addresses. In this manner, the central processing unit 11 (FIG. 1) is accessible to the register group 33 through the first bus 13 to store the input commands and the input parameters in the command and the parameter registers as stored commands and stored parameters.

Through the multiplexers 25 to 31, a command executing unit 35 is connected to the register group 33. From the first bus 13, a decoder 37 is supplied with the input address signal, read signal, and write signal to supply a start signal to the command executing unit 35 when the input address signal specifies one of the command registers with the input write signal activated to store the input commands in the register group 33 as the stored commands.

When the command executing unit 35 is put into operation of referring to the parameter registers and using the working registers in successively executing the stored commands on the stored parameters, the command executing unit 35 activates a busy signal BSY. Put in operation, the command executing unit 35 converts the coordinates to the addresses of the working registers in the register group 33 and of the graphic memory 21 (FIG. 1) in accordance with each command.

Supplied with the busy signal BSY, a binary busy bit is stored in a status register 39. It will be presumed without loss of generality that the busy bit is given a logic one value and a logic zero value when the busy signal is activated and when the busy signal is, respectively as will presently be described.

The status register 39 supplies the data input/output unit 23 with a status signal representative of whether the busy bit is given the logic one or the logic zero value. The decoder 37 controls a data selection signal delivered to the data input/output unit 23. More specifically, the status register 39 may be given a status register address. The decoder 37 checks the input address signal when supplied with the input read signal. If the input address signal indicates the status register address, the decoder 37 activates the data selection signal to make the data input/output unit 23 select the status signal. Otherwise, the decoder 23 inactivates the data selection signal to make the data input/output unit 23 select a data signal supplied from the register group 33 through the data multiplexer 27.

When put in operation, the command executing unit 35 successively executes the stored commands on the stored parameters. The command executing unit 35 thereby produces an intermediate address signal ADDR, an intermediate data signal DATA, an intermediate read signal RD, and an intermediate write signal WR. The intermediate read and write signals are supplied to a read/write (R/W) control unit 41 together with the intermediate address signal. When the intermediate address signal indicates the addresses of the register group 33, the read/write control unit 41 delivers the intermediate read and write signals to the read and the write multiplexers 29 and 31 as a register read signal RD(r) and a register write signal WR(r), respectively.

The busy signal BSY controls the multiplexers 25 to 31. Only while the busy signal is inactivated, the multiplexers 25 to 31 supply the register group 33 with the input address, data, read, and write signals. While the busy signal is activated, namely, while the command executing unit 35 is put in operation, the multiplexers 25 to 31 supply the register group 33 with the intermediate address and data signals and the register read and write signals to meanwhile continue execution of each of the stored commands.

When the command executing unit 35 finishes execution of each command, the intermediate address signal indicates the addresses for use in the graphic drawing device and becomes the preprocessed address signal ADDR(p). The intermediate data signal becomes the preprocessed data signal DATA(p). The read/write control unit 41 produces the intermediate read and write signals as the preprocessed read and write signals RD(p) and WR(p), respectively. The preprocessed data signal comprises one of the result commands and furthermore the result parameters. The result commands and the result parameters are what are described hereinabove.

In FIG. 1, the central processing unit 11 is supplied through the first bus 13 with the status signal as the output data signal. Referring to the status signal, the central processing unit 11 checks whether the busy bit is given in the status register 39 (FIG. 2) the binary one or the binary zero value. If the busy bit is not given the binary one value, the central processing unit 11 supplies the first bus 13 first with a group of input parameters and then one of the input commands that should be executed on the group of input parameters. Such a command first specifies start of operation of the command executing unit 35 (FIG. 2) as by a microcommand. While the busy bit is given the binary one value, the central processing unit 11 repeatedly checks the busy bit. When the busy bit is switched from the binary one value to the binary zero value, the central processing unit 11 puts the graphic processor 19 into operation and begins to transfer the input command and the input parameters to the preprocessor 15. Start of supply of the input address signal to the decoder 37 (FIG. 2) should be understood as the microcommand.

Figure 3:
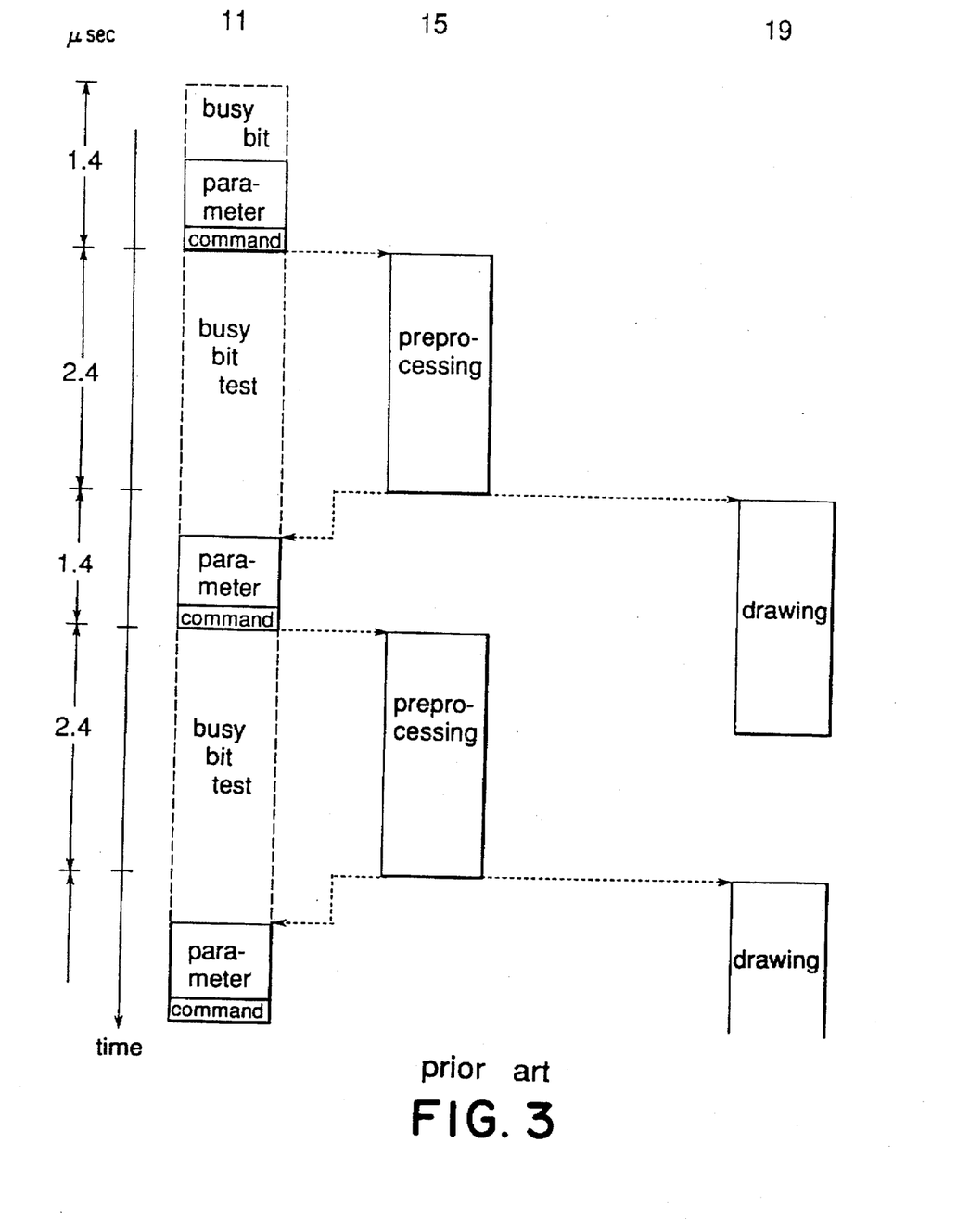
FIG. 3 is a time chart for use in describing operation of the register access control device illustrated in FIG. 2.

Turning to FIG. 3 with FIGS. 1 and 2 additionally referred to, time is scaled in microseconds along a first or leftmost column. Operation of the central processing unit 11 is illustrated along a second column labelled 11. Operation of the preprocessor 15 is depicted along a third column labelled 15. Operation of the graphic processor 19 is shown along a fourth or rightmost column labelled 19.

It will be assumed as an example that one hundred line segments of a common length should successively be drawn as is often the case with the computer aided design (CAD). The central processing unit 11 reads the busy bit in the status register 39. If the busy bit is given the binary zero value, the central processing unit 11 produces a parameter group which indicates a coordinate system and coordinates representative of one and the other end of a first line predetermined among the line segments. Subsequently, the central processing unit 11 produces a command indicative of draw of the first line as a current command.

The central processor 11 makes the preprocessor 15 preprocess the parameter group by making the command executing unit 35 calculate addresses which are used by the graphic processor 19. In this manner, preprocessing proceeds by referring to the parameter registers and without referring to the parameter registers. In other words, operation proceeds both with and without reference to the parameter registers. Meanwhile, the busy bit is given the binary one value.

When the preprocessing comes to an end, the central processing unit 11 puts the graphic processor 19 in operation unless the graphic processor 19 is dealing with a preceding command produced prior to the current command. In the preprocessor 15, the busy bit is given the binary zero value as indicated by a dotted line drawn from the preprocessor 15 to the central processing unit 11 when execution of the preceding command comes to an end. It is now possible for the central processing unit 11 to produce another parameter for a second line predetermined among the line segment even while the graphic processor 19 is dealing with the preprocessed address, data, read, and write signals.

More particularly, the preprocessor 15 preprocesses each stored command in twenty-four steps. If the preprocessor 15 is put in operation with a machine clock of 10 MHz, one step is dealt with in 0.1 microsecond. It takes therefore 2.4 microseconds to deal with each stored command. The graphic processor 19 draws each line segment in 2.4 microseconds.

In the manner exemplified in FIG. 3, a waiting time of 1.4 microseconds is necessary for the central processing unit 11 and for the command executing unit 35. With the conventional register access control device, an overall interval of:

(1.4+2.4)×100+2.4=382.4 (microseconds)

is necessary to draw the one hundred line segments.

In the manner described in the foregoing with reference to FIGS. 1 through 3, the central processing unit 11 and the command executing unit 35 have been kept in a long waiting time. A long execution time has been inevitable on putting the graphic processor 19 in due operation. The of parallel operation of the information processing system and the graphic drawing device have been adversely affected.

Figure 4:
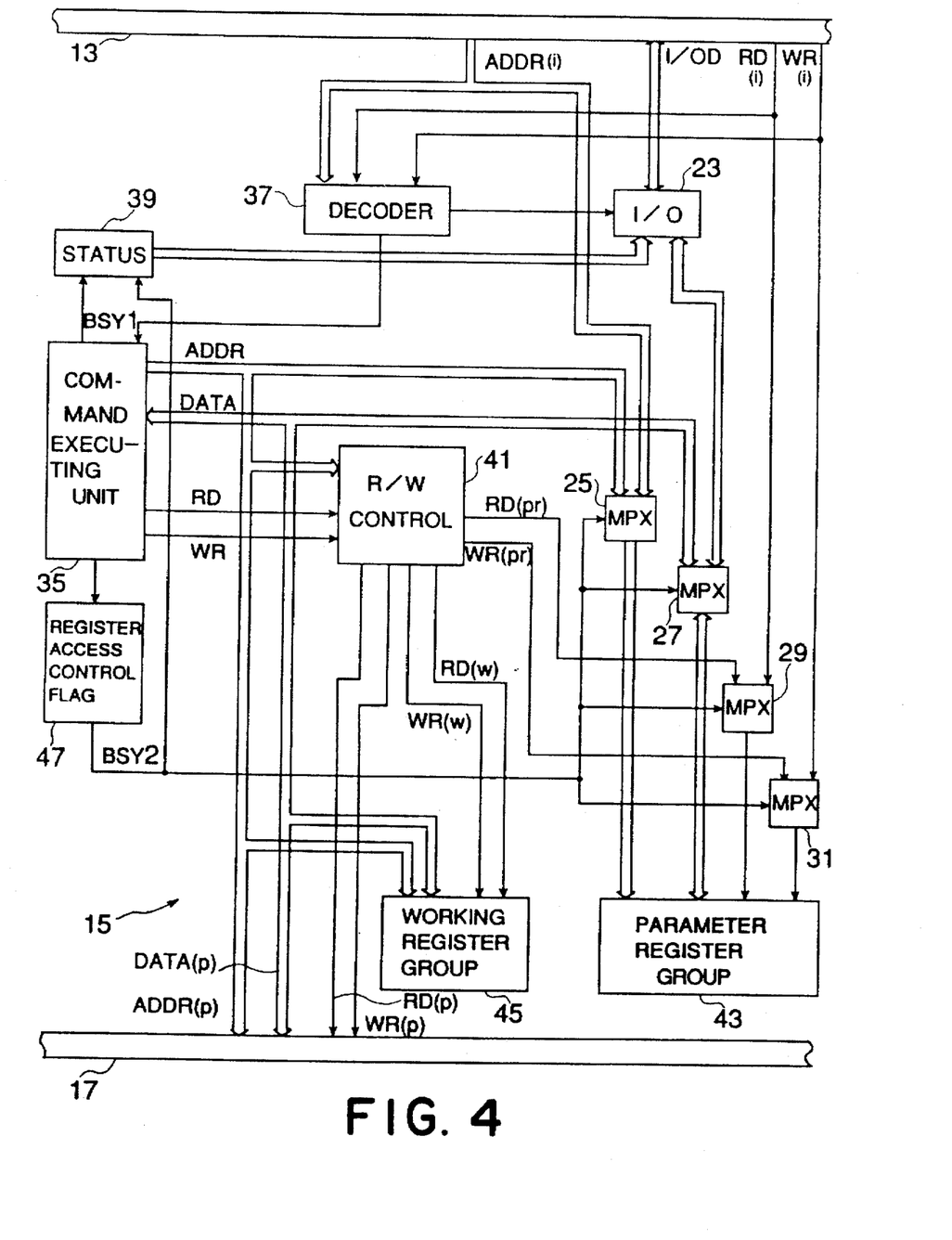
FIG. 4 is a block diagram of a register access control device for use in the circuitry depicted in FIG. 1 according to a first embodiment of the instant invention.

Referring now to FIGS. 1 and 4, the description will proceed to a register access control device according to a first embodiment of this invention. In FIG. 4, similar parts are designated by like reference numerals and are similarly operable with likewise named signals unless otherwise positively mentioned in the following description.

In the register group 33 described in conjunction with FIG. 2, a parameter register group 43 and a working register group 45 are separately depicted. The parameter register group 43 comprises parameter registers and command registers. The command executing unit 35 is connected to the parameter register group 43 through the multiplexers 25 to 31 and to the working register group 45 through two collective paths, one directly and the other through the read/write control unit 41.

When the intermediate address signal ADDR indicates addresses of the parameter register group 43, the read/write control unit 41 delivers the intermediate read and write signals RD and WR as the parameter register group read and write signals RD(pr) and WR(pr) to the parameter register group 43 through the read and write multiplexers 29 and 31, respectively. When the intermediate address signal indicates addresses of the working register group 45, the read/write control unit 41 delivers the intermediate read and write signals directly to the working register group 45 as working register read and write signals RD(w) and WR(w), respectively.

In the manner described with reference to FIG. 2, the command executing unit 35 activates and inactivates the busy signal, which will now be called a first busy signal and be designated by a new reference symbol BSY1. When the decoder 37 finds a little earlier that a parameter group is stored in the parameter register group 43 as a stored parameter group, the decoder 37 makes the command executing unit 35 substantially simultaneously activate an activation signal which will shortly be described. When the command executing unit 35 finishes reference to the parameter registers of the parameter register group 43, the command executing unit 35 inactivates the activation signal.

Connected to the command executing unit 35, a register access control flag 47 is set and reset when the activation signal is activated and inactivated. When set and reset, the register access control flag 47 activates and inactivates a second busy signal BSY2.

The status register 39 is now a two-bit memory having two binary bits. One of the two binary bits is the busy bit described in connection with FIG. 2 and will be designated by BUSY(1). The other of the two binary bits will be referred to as a parameter register free bit or simply as a free bit BUSY(2) and is given the binary one and the binary zero values when the second busy signal is achieved and inactivated. These two binary bits may be identified by bit addresses indicated by the input address signal ADDR(i) although a connection therefor is not depicted. The status signal therefore represents whether the busy and the free bits are individually given the binary one or the binary zero value. When given the binary one value, the busy bit represents a busy state. Meanwhile, the command executing unit 35 is kept in operation. When given the binary zero value, the free bit represents a free state.

The second busy signal is used to control the multiplexers 25 to 31 instead of the first busy signal used to control the multiplexers 25 to 31 in FIG. 2. The parameter group and the command therefor are consequently supplied to the parameter register group 43 only while the second busy signal is kept inactive, namely, only while the free bit indicates the free state. Meanwhile, the parameter register group 43 is isolated from the command executing unit 35. While the second busy signal is active, the command executing unit 35 is connected to the parameter register group 43. In both cases, the command executing unit 35 is connected to the working register group 45 partly directly and partly through the read/write control unit 41.

Figure 5:
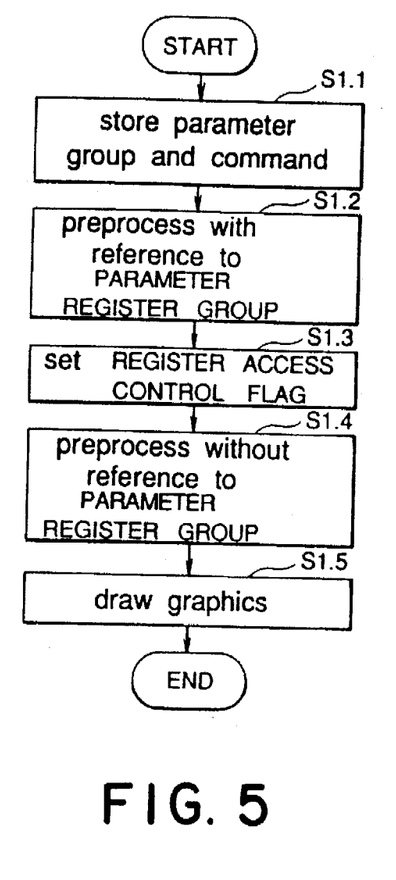
FIG. 5 is a flow chart for use in describing operation of the register access control device illustrated in FIG. 4.

Turning to FIG. 5 with FIGS. 1 and 4 additionally referred to, it will be presumed that the busy and the free bits are given the binary zero value. Inasmuch as the second busy signal BSY2 is inactive, the input address, data, read, and write signals are supplied to the parameter register group 43 through the multiplexers 25 to 31. The central processing unit 11 produces a parameter group and a command therefor.

In the manner depicted at a first step S1.1, the parameter group is stored in the parameter register group 43. Immediately after, the command is stored in the parameter register group 43, when the decoder 37 produces the start signal to put the command executing unit 43 into operation. Executing the command on the parameter group, the command executing unit 35 preprocesses the parameter group and the command as indicated at a second step S1.2 with reference to the parameter register group 43 and by using the working register group 45. The first busy signal is activated. Also activated, the activation signal sets the register access control flag 47 as depicted at a third step S1.3. The second busy signal is activated.

Activation of the second busy Signal makes the multiplexers 25 to 31 supply the parameter register group 43 with the intermediate address and data signals and with the parameter register read and write signals supplied through the read/write control unit 41. Inasmuch as the first and the second busy signals are active, the busy and the free bits are given the binary one value.

Finishing reference to the parameter register group 43, the command executing unit 35 inactivates the activation signal to reset the register access control flag 47. The second busy signal is turned inactive to give the binary zero value to the free bit. The command executing unit 35, however, continues preprocessing with only the working register group 45 used. In other words, preprocessing continues without reference to the parameter register group 43 as indicated at a fourth step S1.4.

When operation of the command executing unit 35 comes to an end, the first busy signal is inactivated to give the binary zero value to the busy bit. If the graphic drawing device has already completed at this instant its operation of dealing with the preprocessed address, data, read, and write signals produced by the command executing unit 35 in connection with a preceding command, the central processing unit 11 activates the graphic drawing device. At a fifth step S1.5, the graphic drawing device draws the graphics in accordance with the preprocessed address, data, read, and write signals produced in response to the current command. If the graphic drawing device has not yet completed its operation at this instant, the central processing unit 11 activates the graphic drawing device after completion of the operation in question.

Figure 6:
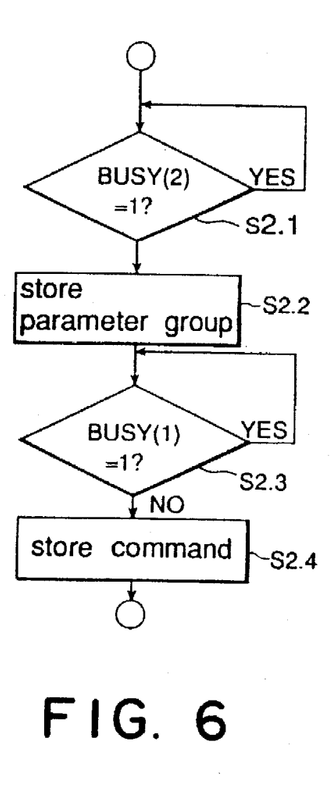
FIG. 6 is another flow chart for use in describing operation of the register access control device depicted in FIG. 4.

Further turning to FIG. 6 with FIGS. 1 and 4 continuously referred to, attention will be directed to operation of the register access control device being illustrated. First, the central processing unit 11 supplies the bit address of the free bit BUSY(2) to the first bus 13.

At a first step S2.1, the central processing unit 11 checks or tests the busy bit. If the free bit is given the binary one value, the central processing unit 11 repeats the check of the free bit.

When the central processing unit 11 finds the binary zero value in the free bit, the central processing unit 11 sends a current input parameter group as the input/output data signals to the parameter register group 43 together with the input address signal indicative of the parameter registers and with the input write signal. At a second step S2.2, the parameter group is stored in the parameter registers as a stored parameter group. At the first and the second steps Si.1 and S1.2, the busy bit BUSY(i) may be given whichever of the binary one and the binary zero values.

Until the command executing unit 35 finishes dealing with an input command issued by the central processing unit 11 for a previously produced parameter group, the central processing unit 11 should not produce a command which deals with the current parameter group. The central processing unit 11 consequently accesses the busy bit to check at a third step S2.3 whether or not the binary one value is given to the busy bit. If the binary one value is given, the central processing unit 11 repeatedly checks the busy bit.

When the binary zero value is found, the central processing unit 11 produces the input command for the current parameter group together with the input address signal indicative of a pertinent one of the command registers in the parameter register group 43 and with the input write signal. At a fourth step S2.4, the input command is stored in the pertinent command register as a stored command.

Figure 7:
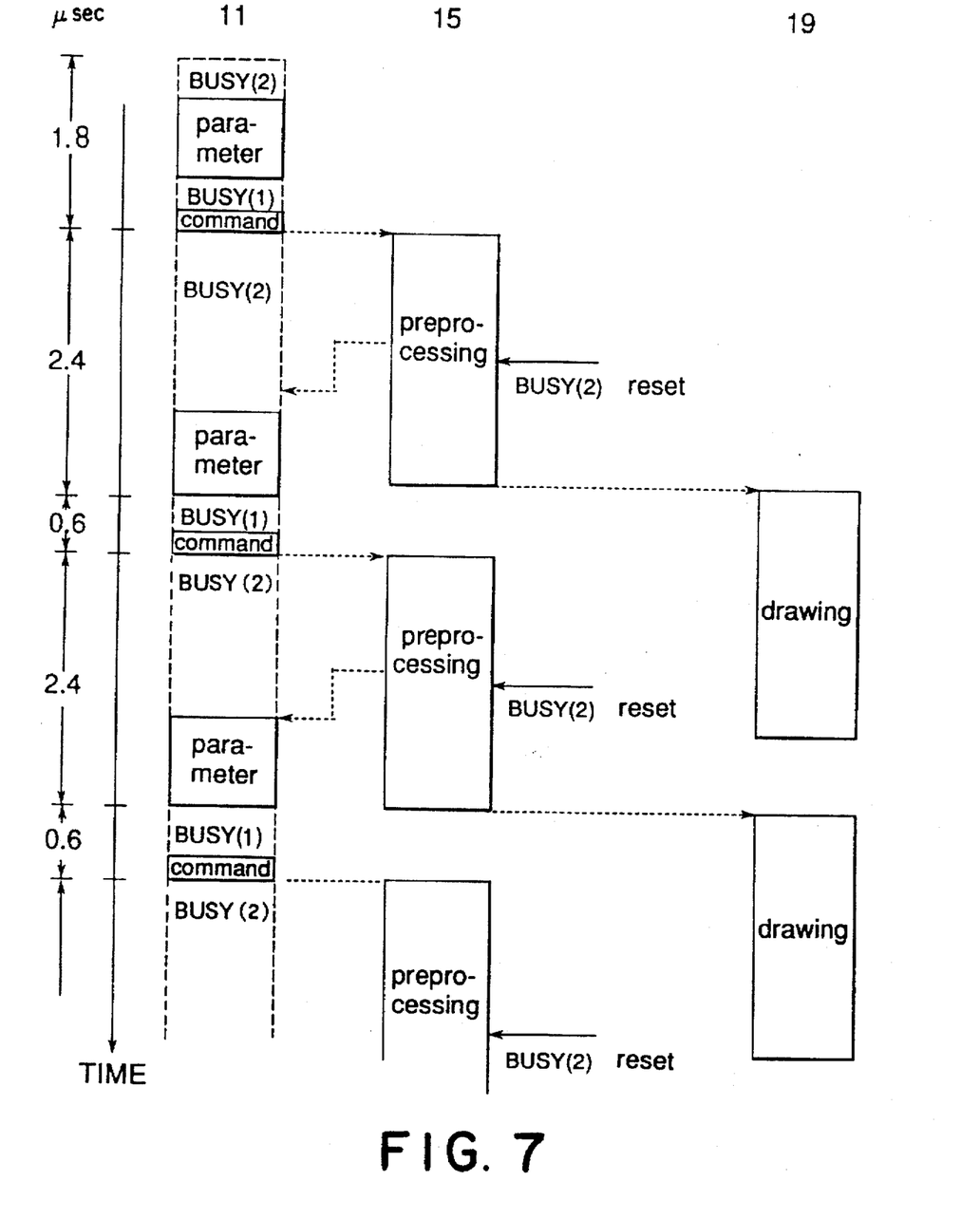
FIG. 7 is a time chart for use in describing operation of the register access control device depicted in FIG. 4.

Referring to FIG. 7 in addition to FIGS. 1 and 4 through 6, time and operation of the central processing unit 11, the preprocessor 15, and the graphic processor 19 are depicted along first through fourth columns from left to right like in FIG. 3. It will again be assumed that one hundred line segments should successively be drawn.

Finding the binary zero value in the free bit BUSY(2), the central processing unit 11 stores a first input parameter group in the parameter register group 43 as a first stored parameter group. Like in FIG. 3, the first input parameter group indicates coordinates for a first line predetermined among the line segments. The decoder 37 makes the command executing unit 35 activate the activation signal.

Finding the binary zero value in the busy bit BUSY(1), the central processing unit 11 stores a first input command for the first input parameter group in the parameter register group 43 as a first stored command. The decoder 37 starts preprocessing by the preprocessor 15, namely, starts operation of the command executing unit 35. The first busy signal BSY1 is activated. The busy bit is given the binary one value. The register access control flag 47 is set by the activation signal to activate the second busy signal BSY2. The free bit is also given the binary one value. The command executing unit 35 continues its operation with reference to the parameter register group 43 and by the use of the working register group 45. Meanwhile, the free bit is kept at the binary one value.

Finishing reference to the stored parameter group, the command executing unit 35 inactivates the activation signal. The free bit BUSY(2) is reset when twelve steps are dealt with among the twenty-four steps described in conjunction with FIG. 3. The command executing unit 35 continues its operation by using the working register group 45 and without reference to the parameter register group 43.

Inasmuch as the free bit BUSY(2) is given the binary zero value, the central processing unit 11 can store a second input parameter group in the parameter register group 43 as a second stored parameter group while operation of the command executing unit 35 is continued by using the working register group 45. The free bit is again given the binary one value. The second input parameter group is for a second line predetermined among the line segments.

In due course, the command executing unit 35 finishes execution of the first stored command by using the working register group 45. The busy bit BUSY(1) is given the binary one value. The graphic drawing device 19 is put in operation of drawing the first line.

More particularly, such a parameter group represents coordinate combinations (X1, Y2) and (X2, Y2) of both ends of each line. It takes 0.2 microsecond for the central processing unit 11 to transfer each of the coordinates to the parameter register group 43 for storage therein. It takes 0.2 microsecond for the central processing unit 11 to transfer each command for storage in the parameter register group. It takes 0.2 microsecond for the central processing unit 11 to read the busy or the free bit. An additional time of 0.2 microsecond is necessary for the central processing unit 11 to check the busy or the free bit.

In contrast to the waiting time of 1.4 microseconds exemplified with reference to FIG. 3, the waiting time is only 0.6 microsecond long in the example being illustrated. This is because the free bit is reset when the command execution unit 35 finishes twelve steps and because it takes 0.4 microsecond in total as described above for the central processing unit 11 to check the free bit.

As a consequence, the overall interval is reduced by:

$$(1.4-0.6)\times 99=79.2 \text{ (microseconds)},$$

as compared with that described in conjunction with FIG. 3. It should, however, be noted that the central processing unit 11 must first check the free bit BUSY(2) in addition to check of the busy bit BUSY(1) on storing the first input parameter group and the first input command in the parameter register group 43. An additional time of 0.4 microsecond is necessary in reading and checking the free bit. It therefore takes in practice an overall interval of:

$$382.4-79.2+0.4=303.6 \text{ (microseconds)},$$

which is 79% of the overall interval necessary with the conventional register access control device.

FIGS. 1 and 4 through 7 will be reviewed. It is understood that the register access control device is connected to the central processing unit 11 through the first bus 13 and comprises: (A) a parameter register group 43 which the central processing unit 11 is accessible through the bus 13 to store commands and parameters therein as stored command and stored parameters; (B) a working register group 45; (C) a command executing unit 35 connected to the parameter register group 43 and to the working register group 45 and put in operation of referring to the parameter register group 43 and using the working register group 45 in executing the stored commands on the stored parameters; and (D) a busy/free indicating arrangement connected to the bus 13 and to the command executing unit 35. In the manner which will be described more in detail in the following, the busy/free indicating arrangement indicates a busy state and a free state when the command executing unit 35 is put into operation and when the command executing unit 35 finishes reference to the parameter register group 43 during execution of the stored commands.

The central processing unit 11 supplies the bus 13 with input parameter groups as the parameters and an input command for processing, as one of the commands, each of the input parameter groups to store each of the input parameter groups and the input command in the parameter register group 43 as a stored parameter group of the stored parameters and a stored command of the stored commands while the busy/free indicating arrangement indicates the free state and while the busy/free indicating arrangement does not indicate the busy state, respectively. The busy/free indicating arrangement indicates the free state and the busy state when the command executing unit 35 finishes reference to the parameter register group 43 and when the input command is stored in the parameter register group 43, respectively.

In the register access control device described in the foregoing, the command executing unit 35 activates and inactivates a first busy signal BSY1 when the input command is stored in the parameter register group 43 and when the command executing unit 35 finishes execution of the stored command, respectively. The command executing unit 35 furthermore activates and inactivates an activation signal when each of the input parameter groups is stored in the parameter register group 43 and when the command executing unit 43 finishes reference to the stored parameter group, respectively. The busy/free indicating arrangement comprises: (a) a register access control flag 47 connected to the command executing unit 35 and set and reset to activate and inactivate a second busy signal BSY2 when the activation signal is respectively activated and inactivated; and (b) a status register 39 connected to the bus 13, the command executing unit 35, and the register access control flag 47 and indicating the busy state and the free state while the first busy signal is activated and while the second busy signal is inactivated.

In the register access control device, the parameter register group 43 is connected to the bus 13 through a switching unit which comprises the address and the data multiplexers 25 and 27 in the example illustrated with reference to FIGS. 1 and 4. The busy/free indicating arrangement produces a first and a second control signal while indicating the free and the busy state, respectively. More particularly, the register access control flag 47 produces the first control signal by inactivating the second busy signal while the status register 39 indicates the free state. The command executing unit 35 produces the second control signal by activating the first busy signal while the status register 39 indicates the busy state. The switching unit is connected to the register access control flag 47 of the busy/free indicating arrangement and is controlled by the first control signal to make the central processing unit 11 supply the input parameter groups therethrough to the parameter register group 43 regardless of the second control signal, namely, irrespective of whether or not the second control signal is produced.

Figure 8:
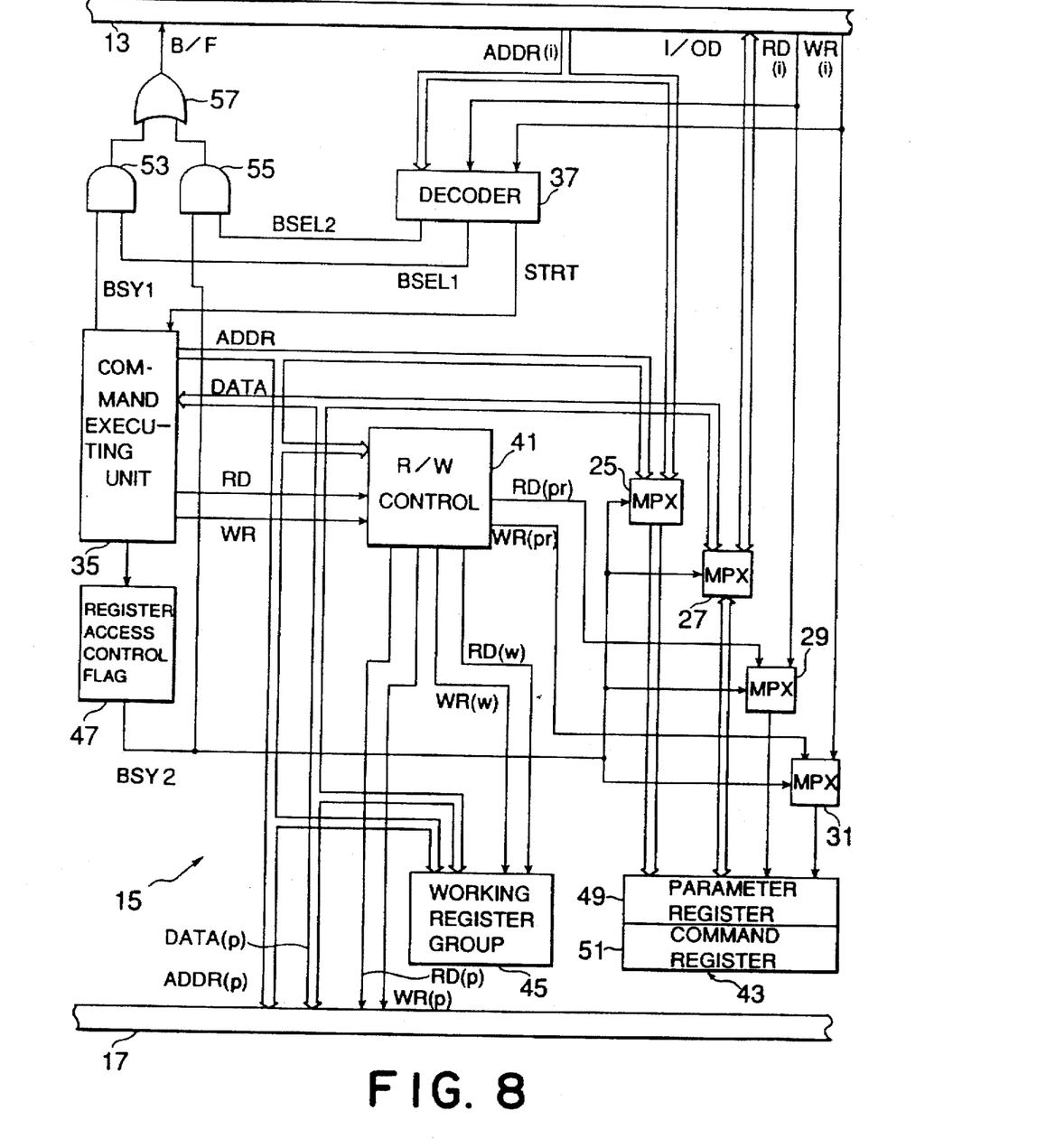
FIG. 8 is a block diagram of a register access control device for use in the circuitry depicted in FIG. 1 according to a second embodiment of this invention.

Referring now to FIGS. 1 and 8, attention will be directed to a register access control device according to a second embodiment of this invention. In FIG. 8, similar parts are designated by like reference numerals and are similarly operable with likewise named signals unless otherwise positively mentioned in the following.

In FIG. 8, the register access control device does not comprise the data input/output control unit 23 and the status register 39 described in conjunction with FIG. 2 or 4. Inasmuch as the input/output control unit 23 is not used, neither the status register address nor the bit addresses are necessary. A parameter register 49 and a command register 51 are separately depicted in the parameter register group 43. It should be known that the parameter register 49 collectively shows a plurality of parameter registers for storing each stored parameter group.

The decoder 37 is supplied with the input address signal ADDR(i) and the input read and write signals RD(i) and WR(i) as in FIGS. 2 and 4. When the central processing unit 11 produces a command address signal indicative of the command register 51 as the input address signal and furthermore when the input write signal is produced, the decoder 37 activates a first busy selection signal BSEL1. When supplied with a parameter address signal indicative of the parameter register 49 and with the input write signal, the decoder 37 activates a second busy selection signal BSEL2.

When an input command is stored in the command register 51, the decoder 37 produces the start signal which is now indicated by STRT. The command executing unit 35 activates the first busy signal BSY1 and substantially concurrently the activation signal as before. Like in FIG. 4, the register access control flag 47 activates and inactivates the second busy signal BSY2. The command executing unit 35 inactivates the first busy signal, finishing execution of each stored command.

A first AND gate 53 is connected to the command executing unit 35 and to the decoder 37. Supplied with the first busy signal and the first busy selection signal, the first AND gate 53 produces a first AND output signal to serve as the busy bit BUSY(1) described before. A second AND gate 55 is connected to the register access control flag 47 and to the decoder 37. Supplied with the second busy signal and the second busy selection signal, the second AND gate 55 produces a second AND output signal. When the second AND output signal is produced with the binary zero value, the second AND gate 55 serves as the free bit BUSY(2).

It is consequently understood that the first and the second busy selection signals should be kept active at least while the first and the second busy signals are kept active. An OR gate 57 is connected to the first bus 13 and to the first and the second AND gates 53 and 55. The OR gate 57 therefore produces the first and the second AND output signals as an OR output signal, which may be called a busy/free signal B/F and is supplied to the central processing unit 11 as the output data signal of the input and output data signals I/OD. The busy/free signal indicates the busy and the free states.

It is furthermore understood that a combination of the first and the second AND gates 53 and 55 and the OR gate 57 is included as a logic circuit in the busy/free indicating arrangement. The decoder 37 is also included.

Figure 9:
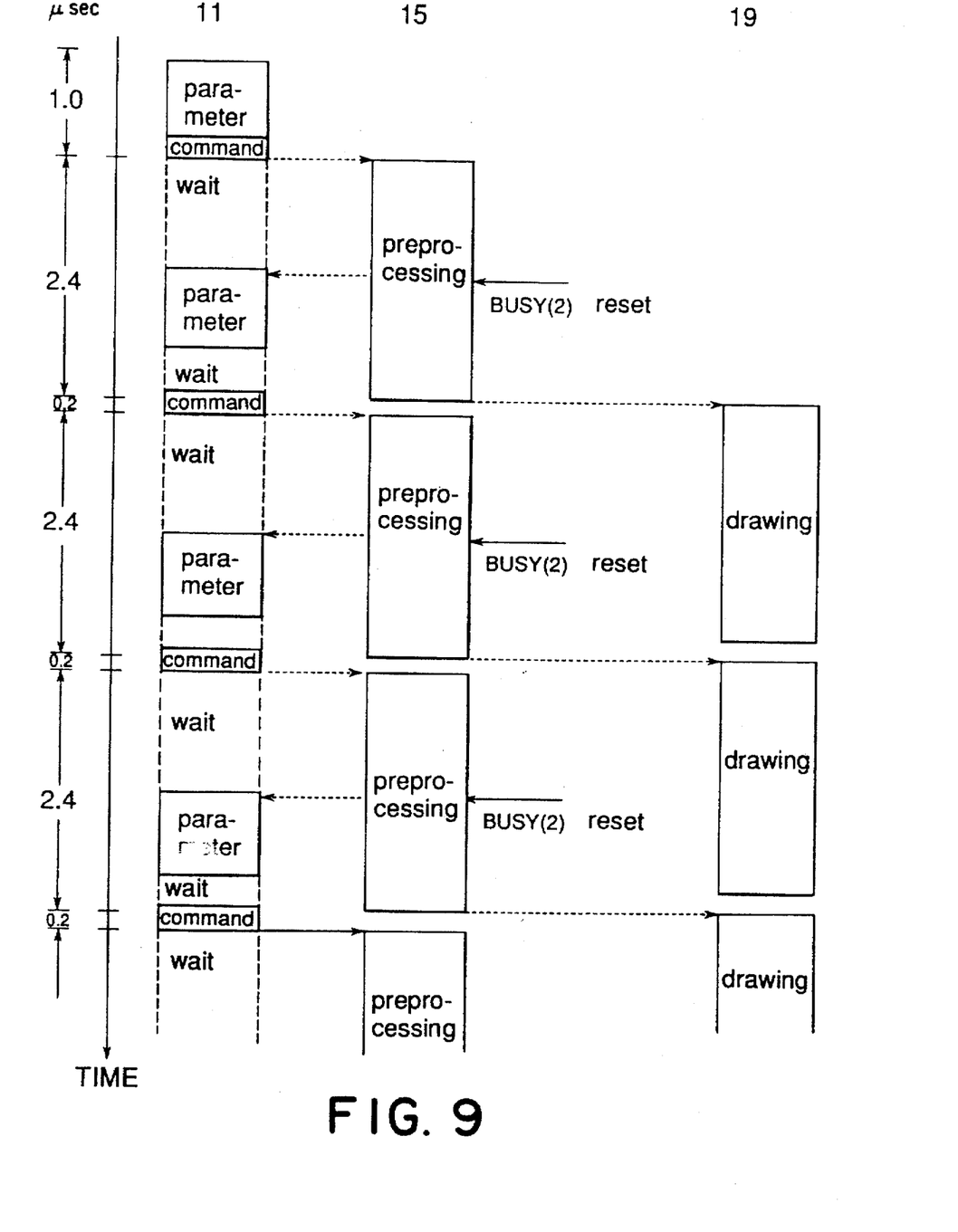
FIG. 9 is a time chart for use in describing operation of the register access control device illustrated in FIG. 8.

Turning to FIG. 9 with FIGS. 1, 5, and 8 additionally referred to, it should preliminarily be known that the preprocessor 15 is operable in the manner described with reference to FIG. 5. In FIG. 9, time and operation of the central processing unit 11, the preprocessor 15, and the graphic processor 19 are depicted along first through fourth columns from left to right as in FIGS. 3 and 7. It will once again be assumed that one hundred line segments should successively be drawn.

It is presumed that the busy/free signal B/F is already made to indicate the free state before the central processing unit 11 begins to prepare for drawing of the line segments. The central processing unit 11 first stores a first input parameter group in the parameter register 49 as a first stored parameter group. Together with the first input parameter group, the central processing unit 11 produces the parameter address signal. The decoder 37 consequently activates the second busy selection signal BSEL2. It is, however, presumed as above that the second busy signal BSY2 is inactive.

Like in FIGS. 3 and 7, the first input parameter group indicates coordinates for a first line predetermined among the line segments. Immediately following, the central processing unit 11 stores a first input command for the first input parameter group in the command register 51 as a first stored command. The first busy selection signal BSEL1 is activated. The first busy signal BSY1 is, however, presumed to be inactive as above.

The busy/free signal B/F now indicates the busy state. The central processing unit 11 is put in a waiting state insofar as the graphic drawing device is concerned.

Meanwhile, the preprocessor 15 is put in operation of preprocessing the first stored parameter group by using both of the parameter register group 43 and the working register group 45. In due course, the command executing unit 35 finishes reference to the parameter register 49. The free bit BUSY(2) is reset. The command executing unit 35 continues its operation by using the working register group 45 alone.

It is possible for the central processing unit 11 to produce a second input parameter group for immediate storage in the parameter register 49 as a second stored parameter group even while operation of the command executing unit 35 is continued by the use of the working register group 45 alone.

The command executing unit 35 may, however, not yet finish at this instant of time execution of the first stored command. In such an event, the central processing unit 11 is again put in the waiting state.

When the command executing unit 35 finishes execution of the first stored command, the busy state BUSY(1) is reset. Checking thereupon the busy/free signal, the central processing unit 11 produces a second input command for the second input parameter group. The second input command is immediately stored in the command register 51 as a second stored command. When the busy bit is reset, the central processing unit 11 makes the graphic processor 19 begin its operation of drawing the first line.

Inasmuch as the second stored parameter group and the second stored command are already readily available in the parameter register 49 and the command register 51, the preprocessor 15 is put in operation of executing the second stored command by referring to the parameter register group 43 and by using the working register group 45. After the free bit BUSY(2) is reset, the preprocessor 15 continues its operation by using the working register group 45 alone.

In the example being illustrated, a waiting time is only 0.2 microsecond long for the command executing unit 35 and for the central processing unit 11 in dealing with the graphic drawing. This waiting time is between completion of execution of a previously stored command and start of execution of a current stored command and is indispensable in storing another input command as the current stored command in the command register 51.

As a result, the overall interval is reduced by:

(1.4−0.2)×99=118.8 (microseconds), as compared with that described in connection with FIG. 3. It should, however, be noted that the central processing unit 11 need not check the busy/free signal B/F before production of the first input parameter group. It therefore takes in practice an overall interval of only:

382.4−118.8−0.4=263.2 (microseconds), which is 69% of the overall interval necessary with the conventional register access control device.

FIGS. 1, 4, 8, and 9 will be reviewed. In the example being illustrated, the parameter register group 43 comprises a plurality of parameter registers collectively as a parameter register 49 and at least one command register 51. The parameter register 49 is identified by a parameter address signal and the command register 51, by a command register address signal. The parameter and the command register address signal are included in the input address signal ADDR(i).

In the manner described before, the command executing unit 35 activates and inactivates the first busy signal BSY1 when the input command is stored as the stored command in the command register 51 indicated by the command address signal and when the command executing unit 35 finishes execution of the stored command, respectively. The command executing unit 35 activates and inactivates the activation signal when each of the input parameter groups is stored as the stored parameter group in the parameter register 49 in accordance with the parameter address signal and when the command executing unit 35 finishes reference to the stored parameter group, respectively.

Under the circumstances, the busy/free indicating arrangement comprises: (a) a decoder 37 connected to the bus 13 and the command executing unit 35 to produce the start signal STRT when the input command is stored in the command register 51, to activate the first busy selection signal BSEL1 when the central processing unit 11 begins production of the command address signal, and to activate the second busy selection signal when the central processing unit 11 begins production of the parameter address signal; (b) a register access control flag 47 connected to the command executing unit 35 and set and reset to activate and inactivate the second busy signal BSY2 when the activation signal is activated and inactivated, respectively; and (c) a logic circuit (53–57) connected to the bus 13, the command executing unit 35, the decoder 37, and the register access control flag 47 to indicate the busy state and the free state while the first busy signal and the first busy selection signal are activated and while the second busy signal is inactivated with the second busy selection signal activated.

In the register access control device under consideration, the parameter register 49 and the command register 51 are connected to the bus 13 through the switching unit (25, 27) as before. The register access control flag 47 produces the first control signal by inactivating the second busy signal BSY2 while the logic circuit indicates the free state. The command executing unit 35 produces the second control signal by activating the first busy signal BSY1 while the logic circuit indicates the busy state. The switching unit is connected to the register access control flag 47 of the busy/free indicating arrangement and is controlled by the first control signal to make the central processing unit 11 supply the input parameter groups therethrough to the parameter register 47 regardless of the second control signal, namely, irrespective of whether or not the second control signal is produced.

In the register access control device described with reference to FIG. 1 and to either of FIGS. 4 and 8, the busy/free indicating arrangement inhibits, while indicating the busy state, the central processing unit 11 to access the parameter register group 43 and keeps the command executing unit 35 in operation by referring to the parameter register group 43 and by using the working register group 45. The busy/free indicating arrangement allows, while indicating the free state, the central processing unit 11 to access the parameter register group 43 and makes the command executing unit 11 continue execution of each stored command by using the working register group 45 alone.

In the example illustrated with reference to FIGS. 1 and 8, it is unnecessary to read the status register 39 described in connection with FIG. 4 for check or test of its binary bits. The processing time is therefore much reduced particularly when a plurality of commands should successively be executed with each command executed in a short time. The register access control device under consideration is very effective when access to the first bus 13 is prevented from congestion as by the use of the second bus 17 for specific use in dealing with the graphic drawing.

Reviewing FIGS. 1 and 3 through 8, each input parameter group may represent more than two coordinate combinations. If the input parameter group represent a great number of such parameters, a long time is necessary for the central processing unit 11 to store this many parameters. The long time is, however, shorter than a time interval during which the command executing unit 35 deals with execution of a stored command on such parameters. It is therefore possible with this invention to shorten the waiting time of the command executing unit 35 and of the central processing unit 11 as regards operation of the utilization device.

For example, let an input parameter group represent ten parameters. Read-out and write-in and storage of this parameter group may take 0.5 microseconds, A command for the parameter group may be executed in 6.9 microseconds. Under the circumstances, the overall interval is 62% and 56% of that necessary in the conventional register access control device for the register access control devices described with reference to FIGS. 1 and 4 and to FIGS. 1 and 8, respectively.

While this invention has thus far been described in specific conjunction with only two preferred embodiments thereof, it is clear in connection with this invention wherein busy information is individually indicated by the busy and the free states that it is possible to allow the central processing unit 11 to produce each input parameter group for storage in the parameter register group even while the command executing unit 35 is in operation by using only the working register group 45. This shortens the waiting time of the central processing unit 11 on dealing with operation of the utilization device and allows parallel operation of information processing and of duly operating the utilization device. In FIG. 4, it is possible to do without the data input/output unit 23 and to make the decoder 37 produce no data selection signal. It should, however, be noted that the central processing unit 11 must check the busy and the free bits even in this event.

What is claimed is:

1. A data processor coupled via a bus to a central processing unit to receive a plurality of sets of information in sequence from said central processing unit, each of said sets of information including a group of parameter data and command data associated with said group of parameter data, said data processor comprising:

a set of registers coupled to said bus and configured to store a certain one of said sets of information;

a command executing unit coupled to said bus and configured to perform a data processing operation designated by said command data included in the certain one of said sets of information stored in said set of registers, wherein said data processing operation includes a first operation that accesses said set of registers to read out said group of parameter data included in said certain one of said sets of information from said set of registers, and a second operation that utilizes said group of parameter data which has been read out from said set of registers;

a control flag coupled to said command executing unit, said control flag being set to a first state during said first operation of said data processing operation, said control flag being set to a second state during said second operation of said data processing operation;

a multiplexer configured to receive said control flag and to operate, when said control flag is in said first state, in a first mode that disconnects said set of registers from said bus to inhibit said central processing unit from accessing said set of registers to said command executing unit to allow said command executing unit to access said set of registers and, when said control flag is in said second state, said multiplexer operates in a second mode that connects said set of registers from said bus and disconnects said set of registers from said command executing unit to allow said central processing unit to access said set of registers to store a group of parameter data included in a next one of said sets of information into said set of registers while said command executing unit is performing said second operation to utilize said group of parameter data included in said certain one of said sets of information.

2. The data processor as claimed in claim 1, wherein said command executing unit produces a busy signal during said data processing operation, and said central processing unit is allowed to store said group of parameter data included in said next one of said sets of information into said set of register, and said central processing unit is inhibited from storing command data into said set of registers until said command executing unit stops producing said busy signal.

3. The data processor as claimed in claim 2, further comprising means for generating a start signal in response to said central processing unit storing said command data included in said next one of said sets of information into said set of registers, said start signal being supplied to said command executing unit to perform a data processing operation designated by said command data included in said next one of said sets of information.

4. The data processor as claimed in claim 1, further comprising a group of working registers, said command executing unit utilizing said group of parameter data which has been read out of said set of registers by use of said set of working registers.

5. The data processor as claimed in claim 2, further comprising a group of working registers, said command executing unit utilizing said group of parameter data which has been read out of said set of registers by use of said set of working registers.

6. The data processor as claimed in claim 3, further comprising a group of working registers, said command executing unit utilizing said group of parameter data which has been read out of said set of registers by use of said set of working registers.

* * * * *